(12) United States Patent
Mellert et al.

(10) Patent No.: US 7,460,025 B2
(45) Date of Patent: Dec. 2, 2008

(54) POWER SUPPLY DEVICE FOR LOW POWER SWITCHING SENSORS OF A MODULAR SYSTEM

(75) Inventors: Martin Mellert, Steinach (DE); Josef Fehrenbach, Haslach i.k. (DE); Thomas Deck, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/587,821

(22) PCT Filed: Jan. 20, 2005

(86) PCT No.: PCT/EP2005/000544
§ 371 (c)(1),
(2), (4) Date: Apr. 23, 2007

(87) PCT Pub. No.: WO2005/075944
PCT Pub. Date: Aug. 18, 2005

(65) Prior Publication Data
US 2007/0273542 A1   Nov. 29, 2007

(51) Int. Cl.
G08B 23/00 (2006.01)
(52) U.S. Cl. .............. 340/693.7; 340/693.5; 361/729; 361/735; 345/156
(58) Field of Classification Search . 340/693.1–693.12; 361/728–747, 730–733
See application file for complete search history.

(56) References Cited

U.S. PATENT DOCUMENTS

| | | | |
|---|---|---|---|
| 4,737,787 A | 4/1988 | Ito et al. | |
| 6,253,610 B1 * | 7/2001 | Struzik et al. | ................. 73/313 |
| 6,402,031 B1 | 6/2002 | Hall | |
| 2004/0104889 A1 | 6/2004 | Fehrenbach et al. | |

FOREIGN PATENT DOCUMENTS

| | | |
|---|---|---|
| DE | 39 15 456 | 11/1990 |
| DE | 19547281 | 7/1996 |
| DE | 196 06 747 | 8/1997 |
| DE | 299 03 260 | 4/2000 |
| DE | 101 13 646 | 9/2002 |
| WO | 93/04422 | 3/1993 |
| WO | 00/50847 | 8/2000 |
| WO | 2004/017026 | 2/2004 |

* cited by examiner

*Primary Examiner*—Davetta W. Goins
*Assistant Examiner*—Hongmin Fan
(74) *Attorney, Agent, or Firm*—Fay Kaplun & Marcin, LLP (57) ABSTRACT

The invention relates to a power supply device for energizing a modular measuring system. The measuring system comprises a modular display and adjustment unit and a modular low power sensor unit. Further, the power supply device is adapted to be disposed and connected electrically between the display and adjustment unit and the low power sensor unit, enabling for the modular display and adjustment unit and the low power sensor unit to be energized simultaneously, and enabling data communication between the display and adjustment unit and the low power sensor unit. Further, the invention is related to a modular system comprising a power supply device, a display and adjustment unit and a low power sensor unit. Finally, the invention relates to a sensor unit with internal energy store for energizing a display and adjustment unit connected thereto.

22 Claims, 8 Drawing Sheets

POWER SUPPLY DEVICE FOR LOW POWER SWITCHING SENSORS OF A MODULAR SYSTEM

TECHNICAL FIELD OF THE INVENTION

The present invention relates to a power supply device for energizing a modular measuring system as well as to a modular system comprising a display and adjustment unit, a power supply device and a low power sensor unit. Moreover, the present invention relates to a low power sensor unit having an energy store device incorporated therein.

Low power sensors to which the present invention is applicable should be sensors having a two wire control loop like a Namur interface allowing only for a very low power requirement of e.g. below 1.2 mA at 5 V for the whole sensor. This e.g. would be a level detection sensor unit/switching sensor unit using capacitive electrodes, conductive electrodes, or a level switch for liquids or solids.

BACKGROUND OF THE INVENTION

Low power sensors as level measurement and detection/switching sensors for liquids and solids incorporating a two wire control loop as a Namur interface operate at very low power requirements in a range below 1.2 mA at 5 V. The energy provided in the sensor is sufficient for level detection. However, if a further component as e.g. an adjustment unit would have to be connected to the sensor, as it would be the case for e.g. an adjustment or setting of the sensor, then, the energy provided in the sensor would not be sufficient to also energize this additional external component, e.g. the adjustment unit, connected thereto.

In a modular system, as it is concerned in the present invention, a modular display and adjustment unit connectable to the modular low power sensor unit would require an additional power source to cooperate, i.e. to input, output or process data. Measurement devices comprising sensors, additional external components and a single power supply are described e.g. in WO 00/50847 A1, DE 195 47 281 A1 and DE 101 13 646 A1, without providing a single power supply device that energizes simultaneously low power sensors and the external components. Common power supplies for low power circuits, described e.g. in WO 1993/004422, are just capable to regulate the input power for energizing low power sensors without providing interfaces for adapting and energizing external components. However, since the system is modular, the display and adjustment unit can also be used together with other sensor units, like e.g. continuously operating sensors in the range of 4-20 mA. These supply sufficient energy to also energize the display and adjustment unit without any further external or additional internal power source. Therefore, it would be meaningful to provide a power supply device which can be used in the modular system to provide both the power for the display and adjustment unit as well as for the additional power needed for the low power sensor unit to cooperate with the display and adjustment unit when it is connected to the sensor.

Moreover, there would be an additional power requirement within the low power sensor unit itself, e.g. for the processing of data received from the component connected thereto and for data communication between the low power sensor unit and the component connected thereto, like a display and adjustment unit as mentioned above.

SUMMARY OF THE INVENTION

According to an aspect of the present invention, a power supply device for energizing a modular measuring system is provided, the measuring system comprising a modular display and adjustment unit and a modular low power sensor unit. The power supply device is adapted to be disposed and connected electrically between the display and adjustment unit and the low power sensor unit, enabling for the modular display and adjustment unit and the low power sensor unit to be energized simultaneously. Further, the data communication between the display and adjustment unit and the low power sensor unit is enabled. According to an exemplary embodiment of the present invention the power supply device is provided with connecting means for detachably connecting the power supply unit with the display and adjustment unit and/or the low power sensor unit.

As low power sensor unit a sensor is referred to, which is provided with for example a two wire control loop, as e.g. a Namur interface, allowing only for a very low power requirement below 1.2 mA at 5 V for the entire sensor. That means, the power is sufficient for the measurement or detection, but another electrical component cannot be energized additionally by this type of sensor unit. Thus, sensors units are concerned in the present invention, which are used for level detection or measurement, like switching sensor units using capacitive electrodes, conductive electrodes, or a level switch for liquids or solids.

The term display and adjustment unit concerns e.g. a module of a modular measuring system which is applicable to all kinds of sensors which are adapted to be connected detachably to the display and adjustment unit. Other sensor units, the display and adjustment unit could be connected to, could comprise radar, ultrasonic, and guided microwave measuring techniques for level measurement, and for pressure measurements hydrostatic pressure transmitters or process pressure transmitters. However, these sensor units all employ continuously operating 4 to 20 mA sensors. These, in contrast to level measurement/switching sensors, also allow for additional components to be energized by the sensor unit, when connected thereto.

The display and adjustment unit used in the modular measuring system could serve for inputting data or commands to be transmitted to the low power sensor unit. It could also be employed for simply outputting data of the low power sensor unit, when connected thereto. In this case, it would only serve as a display unit to display general information of the low power sensor unit. However, the display and adjustment unit could also be used for both, inputting and outputting/displaying data, when connected to the low power sensor unit. In any case, one display and adjustment unit can be used for a couple of sensor units, since it is built modular and is detachably connectable to the sensor unit. Such a display and adjustment unit is already available under the trademark "plicscom" by VEGA Grieshaber KG, Germany. Hence, according to one exemplary embodiment of the present invention the power supply device may be provided on at least one end face with connecting means connectable with the connecting means of the display and adjustment unit available under the trademark "plicscom".

According to a further aspect of the invention, the power supply device has a housing which is adapted to be interposed between the display and adjustment unit and the low power sensor unit, and in which an energy store is arranged. The housing can be made from any material which would also be suitable for the sensor unit or the display and adjustment unit. This would depend on the application, i.e. in what kind of an environment and under what kind of conditions the measurement is carried out, like hot or cold, vacuum or gauge pressure, or in aggressive and abrasive products. Possible materials for the housing are e.g. plastic, stainless steel, or plastic coated aluminum. The energy store could be a battery, an accumulator, or Gold CAP. In case a battery is employed, this would have to be exchanged once in a while. Therefore, the energy store, namely the battery, would have to be arranged within the housing such that it is easily accessible. In case an accumulator or a gold CAP is used, additional means would have to be provided, to recharge the accumulator or gold CAP.

According to a further aspect of the invention, the power supply device is adapted to be fitted to a low power sensor unit, comprising a probe for level measurement or detection/switching of liquids or solids, having a two wire loop, in particular a Namur interface, allowing for a power requirement of <1.2 mA at 5 V. The power supply device connected to this kind of low power sensor unit allows for these sensor units to operate like it is common for continuously operating sensors in the range of 4-20 mA. Therefore, not only the measurement or detection can be carried out, but rather other electrical components can be operated by the additional energy provided by the power supply device.

According to another aspect of the invention, the housing of the power supply device is provided with respective attachment means, being adapted to cooperate with respective attachment means of the display and adjustment unit and the low power sensor unit. The attachment means allow for a detachable engagement of the power supply device both with the display and adjustment unit as well as with the low power sensor unit. Since the whole measuring system is modular, the attachment means should be uniform, i.e. the attachment means should be provided such that the power supply device can attached to the low power sensor unit, but the display and adjustment unit should also be attachable to the low power sensor unit directly, without the power supply device in between. Different kinds of attachment means could be used, however, they have to provide for a detachable engagement, like e.g. a bayonet coupling.

Moreover, according to a further aspect of the invention, the power supply device has first and second contacting means, whereby the first contacting means are provided for connection of the energy store to the display and adjustment unit as well as the low power sensor unit to energize these. The second contacting means are provided for data lines, allowing for communication or data exchange between the display and adjustment unit and the low power sensor unit. These lines are connected through the housing of the power supply device. They could connect e.g. a controller of the display and adjustment unit to a microcontroller of the low power sensor unit to enable data communication, e.g. for configuration of the sensor unit or for storing data of the sensor unit.

The contacting means and the attachment means of the power supply device, however, are provided such that the display and adjustment unit can be positioned on the power supply device in at least two positions. A construction, according to which this can be achieved, is disclosed in U.S. patent application Ser. No. 10/639,232 or in the international patent application PCT/EP03/08940, the contents of which are incorporated herein in its entirety by reference.

Further, according to another aspect of the invention, there is provided a modular system comprising a modular display and adjustment unit, a modular power supply device as it is described above, and a modular low power sensor unit which are detachably connectable to each other and which are adapted to be brought into an electrical contact with each other, whereby the power supply device energizes both the display and adjustment unit as well as the low power sensor unit simultaneously, when the modules are connected to each other. That means that not only the additional component, namely the display and adjustment unit is supplied with power, but also the sensor unit is energized additionally. This renders additional tasks besides the measuring task possible, like communication of a controller of the low power sensor unit with a controller of the display and adjustment unit.

The modular system comprises, according to a further aspect of the invention, a low power sensor unit with a probe for level measurement or detection and/or switching of liquids or solids, the probe comprising a two wire control loop, in particular a Namur interface, allowing for a very low power requirement of <1.2 mA at 5 V.

According to a further aspect of the invention, the low power sensor unit can be adjusted by means of the display and adjustment unit with the power supply unit interposed in between.

Another aspect of the invention is that a controller, accommodated in the display and adjustment unit and a microcontroller accommodated in the low power sensor unit communicate with each other with the power supply unit, having contacting means connecting the respective data lines through the housing, connected in between.

According to a further aspect of the invention, the modular system comprises an A/D converter, being either internal or external to the microcontroller of the low power sensor unit, which reads the voltage of the power supply device to close a circuit upon a predetermined voltage value, to thereby connect the power supply unit to the microcontroller.

According to still another aspect of the invention, the display and adjustment unit and the power supply device are adapted to be attached to each other in at least two positions.

Moreover, one aspect of the invention is a sensor unit, comprising a low power sensor operating in the range below 1.2 mA at 5 V, being built as a module, and being adapted to be brought into detachable engagement with a modular display and adjustment unit, and being connectable electrically thereto, whereby the sensor unit comprises an energy store and a power supply, to allow for energizing both the sensor unit as well as the display and adjustment unit, when attached and connected electrically to the sensor unit.

The sensor unit has as an energy source an accumulator or a gold CAP, which is charged by a step up and a controllable power source, whereby the charging current can be varied depending on the resist current of the sensor. Another aspect of the invention is that the sensor unit comprises further a microcontroller, querying cyclically whether the display and adjustment unit is attached or not, and connecting the display and adjustment unit to the internal power supply, in case the presence of the display and adjustment unit is detected.

According to still another aspect of the invention, the microcontroller monitors the operating voltage of the energy store, to deenergize the display and adjustment unit upon the detection of the operating voltage falling below a predetermined threshold value, and recharges the energy store, whereby the power supply of the measuring operation is not interrupted. Thus, always a safe measuring operation is secured. According to a further aspect of the invention, the microcontroller energizes the display and adjustment unit upon the detection of a minimal operating value of the energy store.

In the following, further details of various embodiments of a display and adjustment unit mentioned above are described. Taking these details into consideration exemplary embodiments of a power supply device and/or a modular system according to the invention become more clear. The display and adjustment unit is designed for being detachably mounted to the electronic equipment in at least two different positions, and has a first contacting means that, independent of the selected position in the mounted state of the input and output device on the electronic equipment, electrically comes into contact with a second contacting means that is present on the electronic device.

First, it has to be noted here that the term display and adjustment unit includes devices of various functions in the meaning of the present invention. According to this, for example, a device has to be understood that only serves for inputting data or instructions for the electronic equipment. Moreover, also a device may fall under the term display and adjustment unit that only serves for outputting data of the electronic equipment, i.e. that displays data or generally information of the electronic equipment to which it is mounted. Apart from that, display and adjustment unit may also include a device that permits the input as well as the output of information, or which optionally permits the former or the latter to be carried out.

All of the above-mentioned display and adjustment units can have in common that they are detachably mountable to an electronic equipment. In particular, it is also devised to provide electronic equipment of different designs and that is in particular even based on various measurement principles—such as pressure measurement, temperature measurement, filling level measurement on the basis of ultrasonic waves or microwaves, as well as filling level measurement and also, for example, limit state detection—with an always identically designed reception means that permits a display and adjustment unit according to the invention to be mounted.

According to a further aspect, a display and adjustment unit for inputting data and/or for displaying information of an electronic equipment is introduced, that comprises an attachment means for detachably mounting the display and adjustment unit to the electronic equipment, and a first contacting means that, in the mounted state of the display and adjustment unit on the electronic equipment, electrically comes into contact with a second contacting means present on the electronic equipment. The attachment means here may either be designed in such a manner that it only permits a single position for mounting the display and adjustment unit to the electronic equipment or that more than one position may be adopted. It is possible that the display and adjustment unit is also designed in such a manner that it may adopt any desired position on a circle, for which purpose the attachment means then may permit a rotational movement.

A further aspect of the invention relates to an operating and display module for an electronic equipment, with the module being designed for being detachably mounted to the electronic equipment in at least two different positions. The module includes at least one means of the group of means comprised of an input means and display means, a first attachment means, which may be detachably engaged in any selected mounting position on the electronic equipment by means of a second attachment means, and a first contacting means that, in the mounted state of the operating means on the electronic means, contacts a second electric contacting means that is part of the electronic equipment so as to transmit signals to the electronic device corresponding to the inputs into the input device and/or to display data from the electronic equipment on the display means.

According to a further aspect of the present invention, an electronic equipment is provided that is designed for detachably receiving a display and adjustment unit. The electronic equipment comprises a reception device for detachably mounting a display and adjustment unit, a contacting means that, independent of the selected position in the mounted state of the display and adjustment unit on the electronic equipment, electrically comes into connection with a contacting means present on the display and adjustment unit.

Furthermore, according to an exemplary embodiment of the present invention, a combination of an electronic equipment and a display and adjustment unit is proposed, in particular a combination of a plurality of electronic equipment of different designs and/or measurement principles, each of which possesses the same reception for a display and adjustment unit to be mounted thereto. Therewith, it is for the first time possible to operate a plurality of electronic equipment or to fetch their data and to display them on site by means of only one display and adjustment unit.

In a further exemplary embodiment of a display and adjustment unit according to the invention, the first contacting means comprises plural groups of contacting means, and the groups of contacting means are arranged spaced apart from each other. One advantage of such an arrangement may be that only one second contacting means needs to be present on the electronic device, which, depending on the selected position, electrically comes into contact with one of the groups of contacting means on the display and adjustment unit in the mounted state of the display and adjustment unit. Of course, it is also possible that the second contacting means present on the electronic equipment comprises plural groups of contacting means, and that only one contacting means is present on the display and adjustment unit. Also in this embodiment, it is guaranteed, independent of the selected position, that always a first contacting means and a second contacting means come into electric contact with each other.

A first contacting means may comprise at least one electric contact surface, and a second contacting means may comprise at least one electric spring contact, that comes into contact with the electric contact surface. Of course, it is also possible that the first contacting means is designed as an electric spring contact, and the second contacting means comprises at least one electric contact surface. Even other detachable contact connections known per se in the art, may be used in an exemplary embodiment of the present invention.

According to an exemplary embodiment of a display and adjustment unit according to the present invention, a first attachment means is present on the display and adjustment unit, which, in the mounted state of the device, detachably comes into engagement with a second attachment means provided on the electronic equipment. This design enables the display and adjustment unit to be fixed to the electronic equipment, preferably in the position selected each time.

A further exemplary embodiment of a display and adjustment unit according to the present invention provides that the first attachment means and the second attachment means together form a bayonet joint. Hereby, a secure and reliable attachment of a display and adjustment unit to an electronic equipment is ensured by a slight axial and rotational movement about a certain angle area, the connection, however, may be detached again. Moreover, it is also possible in such a design that the display and adjustment unit may be attached on the electronic equipment in a constructionally simple manner in various postures or positions or is fixed to the electronic equipment in any selected position.

In particular, in one exemplary embodiment of a display and adjustment unit according to the present invention, the first attachment means comprises at least one pivot, and the second attachment means comprises at least one pivot receiving recess, into which a pivot may be introduced, e.g. by means of a combined axial and rotational movement. The number of pivots and pivot receiving recesses allows the number of selectable positions for mounting the display and adjustment unit to the electronic equipment to be determined. In particular, it is appropriate, when at least two pivots are provided engaging into four recesses for receiving the pivots, so that at least two different positions may be adopted, in particular four different positions may be adopted, each of which turned by 90°.

In order to avoid an unintentional detachment of the display and adjustment unit, at least one of the pivot receiving recesses, in a further exemplary embodiment of a display and adjustment unit according to the present invention, is provided with a blocking means. This blocking means is in particular formed as an elevation that is placed in the pivot receiving recess and that needs to be passed by the pivot with blocking of the first and second attachment means.

One exemplary embodiment of a display and adjustment unit according to the present invention has an upper side and a lower side. The upper side faces the user and comprises at least one operating means and/or one display means. The operating and/or display means are in connection with the first contacting means. The first contacting means is present on the lower side and has contacting surfaces or contacting springs placed in various locations on the lower side, whereby a connection of the second contacting means is ensured in any possible position of attachment. As has already been mentioned before, it is in particular advantageous to provide two or three or four or five groups of contacting surfaces evenly spaced apart from each other on a circle, so that, depending on the number of groups of contacting means, the display and adjustment unit may adopt positions on the electronic equipment differing by 90°, 60° or 45°.

In a further exemplary embodiment of a display and adjustment unit according to the present invention, the display and adjustment unit comprises a device body, which in turn is provided on the lower side of a reception ring, which may be inserted in or slipped on a corresponding reception ring on the electronic equipment.

An further exemplary embodiment of a display and adjustment unit according to the present invention comprises at least one operating key and/or at least one display means.

The display means in particular is in connection with the first contacting means so as to be supplied by the electronic equipment with electric current for the display means and for displaying data of the electronic equipment.

According to a further aspect of the present invention, a display and adjustment unit comprises an attachment means for detachably mounting the display and adjustment unit to the electronic equipment, and a first contacting means that, in the mounted state of the display and adjustment unit on the electronic equipment, electrically comes into contact with a second contacting means present on the electronic equipment. Such a display and adjustment unit needs not forcibly but may be designed such that it may be mounted to the electronic equipment in at least two different positions. Here, the essence of the invention is that the display and adjustment unit may be mounted detachably.

According to a further aspect of the present invention, an operating and display module is provided, with the operating and display module being designed for being detachably mounted to the electronic equipment in at least two different positions and comprising for this purpose at least one means of a group of means comprised of input devices and output devices, a first attachment means, that may be detachably engaged in each selected mounting position to the electronic equipment with a second attachment means present on the electronic equipment, and a first contacting means that contacts in the mounted state of the operating device on the electronic equipment a second contacting means that is part of the electronic equipment so as to transmit electric signals to the electronic equipment corresponding to the inputs into the input device.

As has already been explained before, in such an operating and display module in an exemplary embodiment, as well, the first attachment means and the second attachment means is designed as a bayonet joint. The input device may, for example, be selected from the group of input devices comprised of press button, switch, touch screen, key, roll, rocker switch and joystick. It is also possible to combine various input devices with each other.

In particular, in one exemplary embodiment of an operating and display module according to the present invention, the module is designed essentially cylindrical and fits into a cylindrical reception of the electronic equipment.

According to a further aspect of the present invention, a combination of a display and adjustment unit and at least one electronic equipment is provided. The combination is comprised of a display and adjustment unit for inputting data and/or for displaying information of an electronic equipment, and of at least one electronic equipment, with the display and adjustment units being designed for being detachably mounted to the electronic equipment in at least two different positions and comprising a first contacting means that, independent of the selected position in the mounted state of the display and adjustment unit on the electronic equipment, electrically comes into connection with a second contacting means present on the electronic equipment.

The electronic equipment may be selected from the group of devices comprised, for example, of pressure sensor, filling level sensor, limit value transmitter, temperature sensor.

In an exemplary embodiment of a combination according to the present invention, the electronic equipment has a reception means for receiving the display and adjustment unit, and an attachment means for fixing the display and adjustment unit to the electronic equipment.

In an exemplary embodiment of a combination according to the present invention, the reception means comprises a first plug-in means, and the display and adjustment unit comprises a second plug-in means.

In an exemplary embodiment of a combination according to the present invention, the attachment means for fixing the display and adjustment unit to the electronic equipment is a separate cover member.

In one exemplary embodiment of a combination according to the present invention, the cover member has an internal thread, and the electronic equipment has an external thread, whereby the latter may be screwed on the internal thread.

In a further exemplary embodiment of a combination according to the present invention, the reception means is designed for detachably mounting a display and adjustment unit in at least two different positions.

In an exemplary embodiment of a combination according to the present invention, the contacting means comprises at least one contact spring.

In conclusion, it has to be noted that single features of a device according to the invention such as the above-explained display and adjustment unit, the operating and display module, the electronic equipment, the combination, each may also be realized in the others.

BRIEF DESCRIPTION OF DRAWINGS

Embodiments of the invention will now be described by way of example with reference to the accompanying drawings, in which.

DETAILED DESCRIPTION OF EXEMPLARY EMBODIMENTS OF THE PRESENT INVENTION

Figure 1:
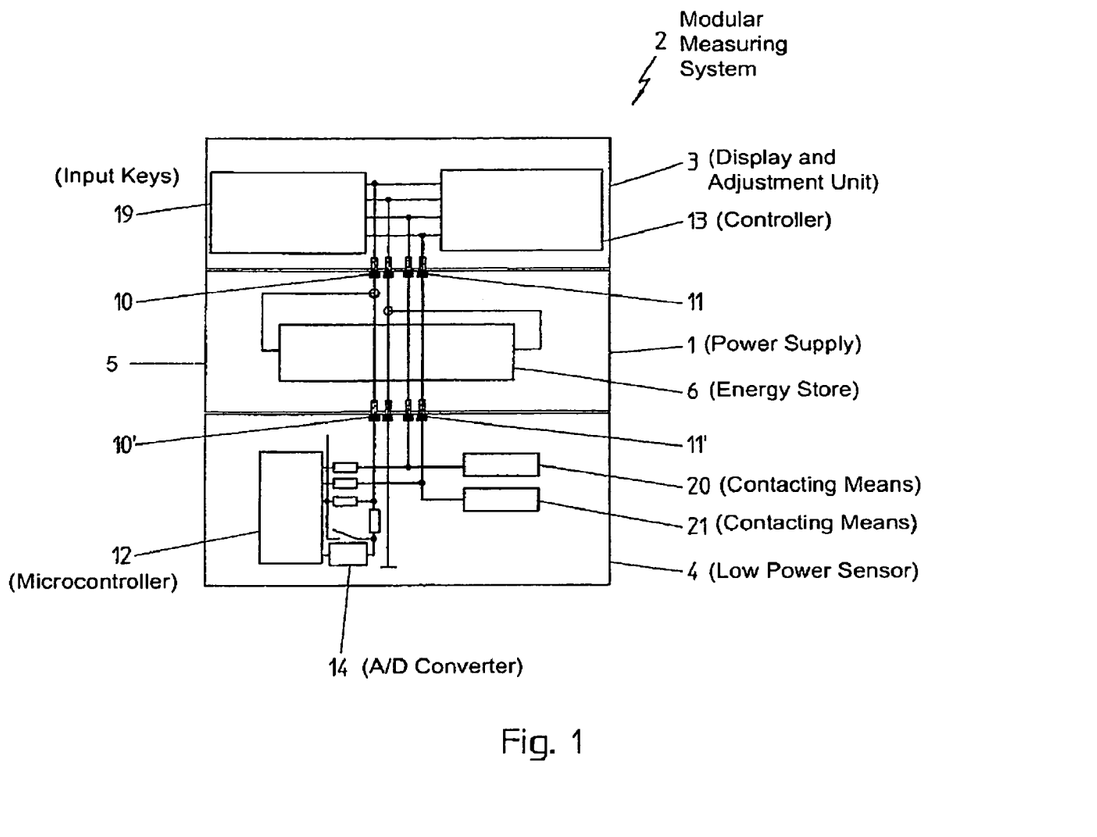
FIG. 1 is a schematic diagram of the modular system according to the invention.

FIG. 1 shows a schematic diagram of the inventive modular measuring system 2, which comprises the power supply device 1, the display and adjustment unit 3, and the low power sensor unit 4. It can be seen that the power supply device is interposed between the display and adjustment unit 3 and the low power sensor unit 4 and is connected to both with respective contacting means 10, 10', 11, 11', connecting respective components of the units in parallel. The display and adjustment unit 3 includes a controller 13 for a LCD, an OLED, a PLED or any other kind of suitable display.

Further, input keys 19 are comprised in the display and adjustment unit 3 which are connected to the controller 13 and to the energy store 6 of the power supply device 1 via first contacting means 20 of the display and adjustment unit 3 and first contacting means 10 of the power supply device 1.

Moreover, FIG. 1 shows that the controller 13 of the display and adjustment unit 3 is connected via second contacting means 20' of the display and adjustment unit 3 and second contacting means 11 of the power supply device 1 and second contacting means 11' as well as second contacting means 21' of the low power sensor unit 4 to the latter.

The low power sensor unit 4 is connected to the energy store 6 of the power supply device 1 via first contacting means 10' of the power supply device 1 and first contacting means 21 of the low power sensor unit 4 such that the energy store 6 supplies the additional power needed during operation of the display and adjustment unit 3 to the microcontroller 12 of the low power sensor unit 4. In case the low power sensor unit 4 is in a pure measuring mode, i.e. without the power supply device 1 and the display and adjustment unit 3 connected thereto, the microcontroller 12 is able to carry out all tasks with the power available within the low power sensor unit 4 without additional energy.

In operation, first the energy store 6 of the power supply device 1 is tristated to $+U_b$ of the low power sensor unit 4. An A/D converter 14 reads the voltage of the energy store 6. In case the voltage lies within the predetermined limits (5% to 20% above $+U_b$), a switch is closed and the energy store 6 is connected to the voltage supply $+U_b$ of the microcontroller via a low resistance resistor.

Figure 2:
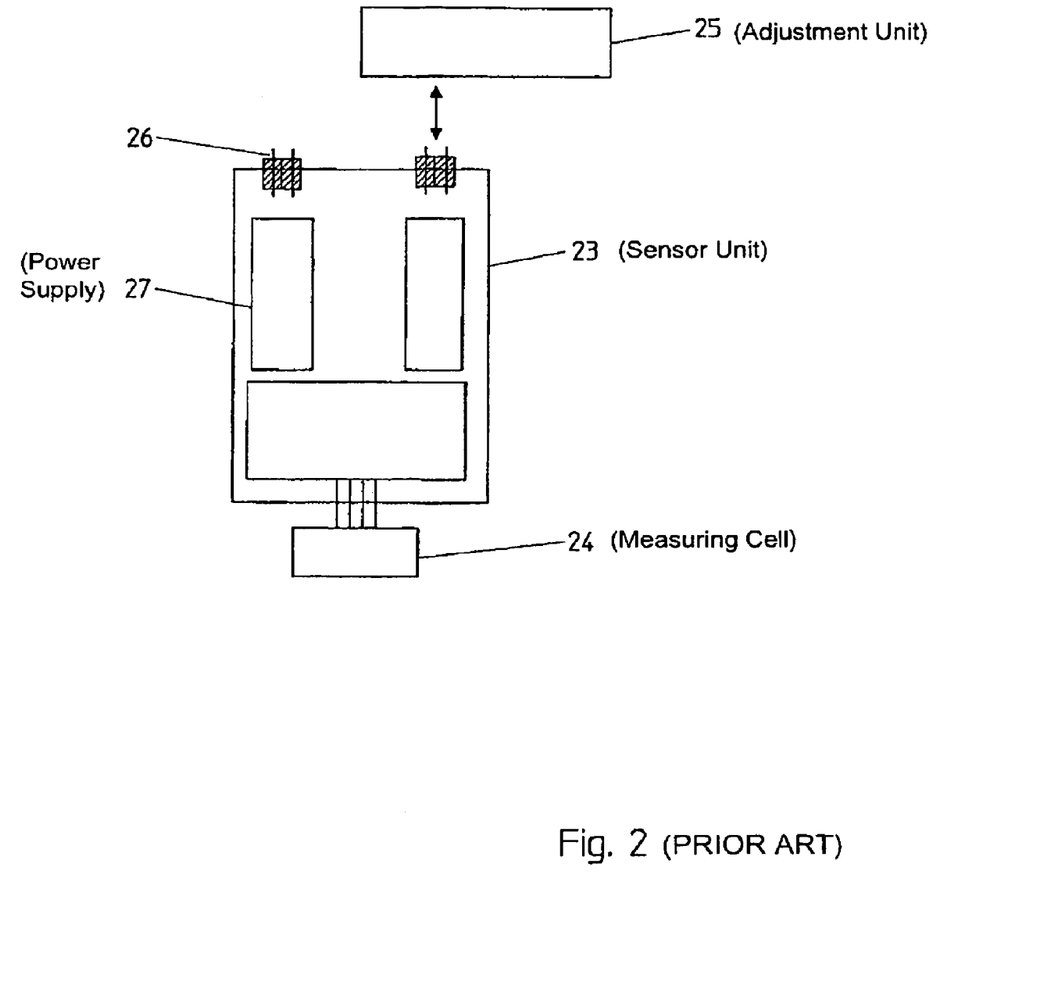
FIG. 2 is a schematic diagram of a modular system according to prior art.

FIG. 2 illustrates a schematic diagram of a modular system of prior art comprising a sensor unit 23 including a low power Namur sensor within a measuring cell 24 and an external display and adjustment unit 25 to be connected to the sensor unit 23. The sensor unit 23 is equipped with a 2 wire control loop 26, a power supply 27, and a microcontroller 23. The input and output device 25, however, needs, if connected to the sensor unit 23, an additional power supply and cannot be fed by the power supply 27 of the sensor unit 23. Therefore, the input and output device 25 has its own internal power source to be able to operate when it is connected to the sensor unit 23.

Figure 3:
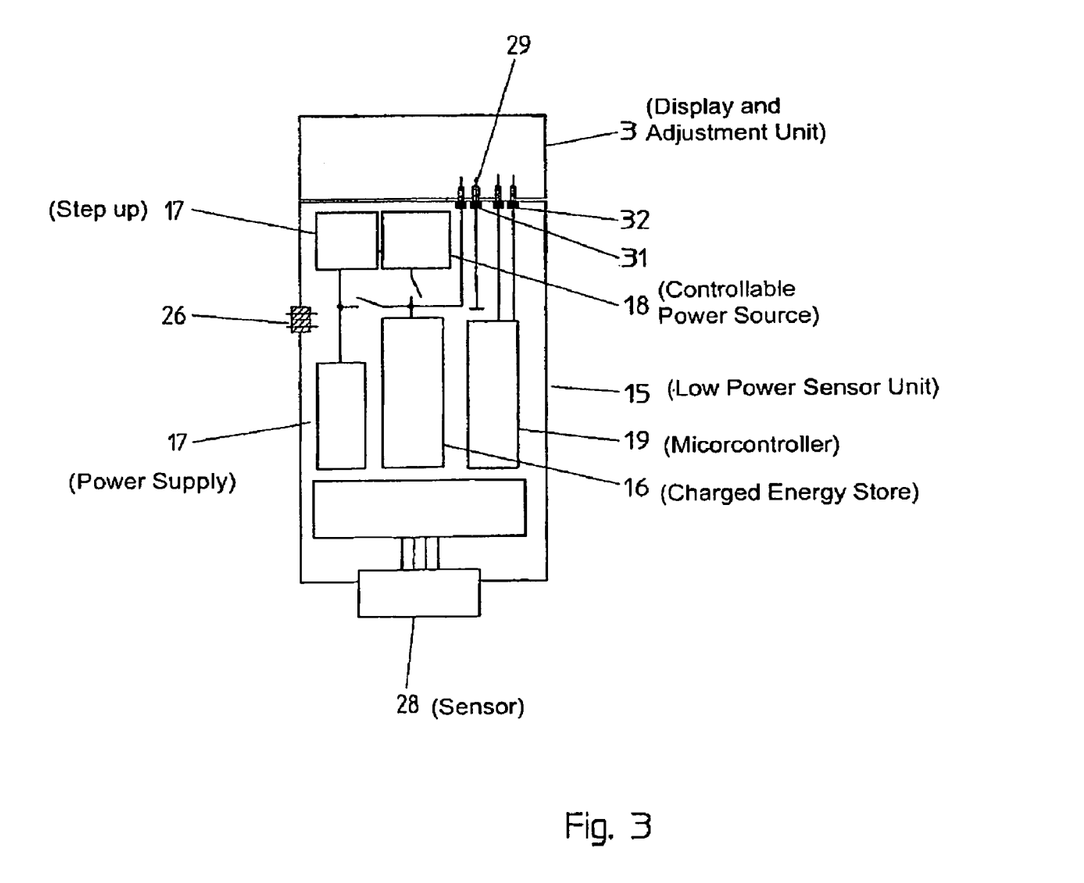
FIG. 3 is a schematic diagram of a sensor unit according to the invention.

FIG. 3 shows another schematic diagram of an inventive solution for energizing a display and adjustment unit 3 to be connected to a low power sensor unit 15. The display and adjustment unit 3 is connected directly to the sensor unit 15 via first and second contacting means (not shown in this figure) of the display unit 3 and first and second contacting means 31, 32 of the low power sensor unit 15, respectively.

The low power sensor unit 15 comprises a microcontroller 19, an energy store 16, being either an accumulator or a gold CAP, a power source 18, a step up 17, a two wire control loop 26, a power supply 17, and a sensor 28. The accumulator, i.e. the energy store 16 is charged via the step up 17 and the controllable power source 18. Depending on the resist current of the sensor, the charging current can be varied, to obtain a loading period which is as short as possible. The display and adjustment unit 3 is connected to the charged energy store 16.

The microcontroller 19 queries cyclically whether the display and adjustment unit 3 is connected or not. After detection of the display and adjustment unit 3 being connected, the energy store 16 is connected to the internal power supply 17 of the low power sensor unit 15. The microcontroller monitors the operating voltage. In case it is too low, the microcontroller deenergizes the energy store 16, and thus the display and adjustment unit 3, and recharges the energy store 16. If there is no communication between the display and adjustment unit 3, the power requirement is sufficiently low. As the energy store 16 reaches a minimal operating value, the display and adjustment unit 3 is activated again. Thus, the additional energy required for an operating phase of the display and adjustment unit, is supplied by the energy store 16. Should the energy stored in the energy store 16 be too low, only the display and adjustment unit 3 is deactivated and the measuring task can be carried out continuously.

Figure 4:
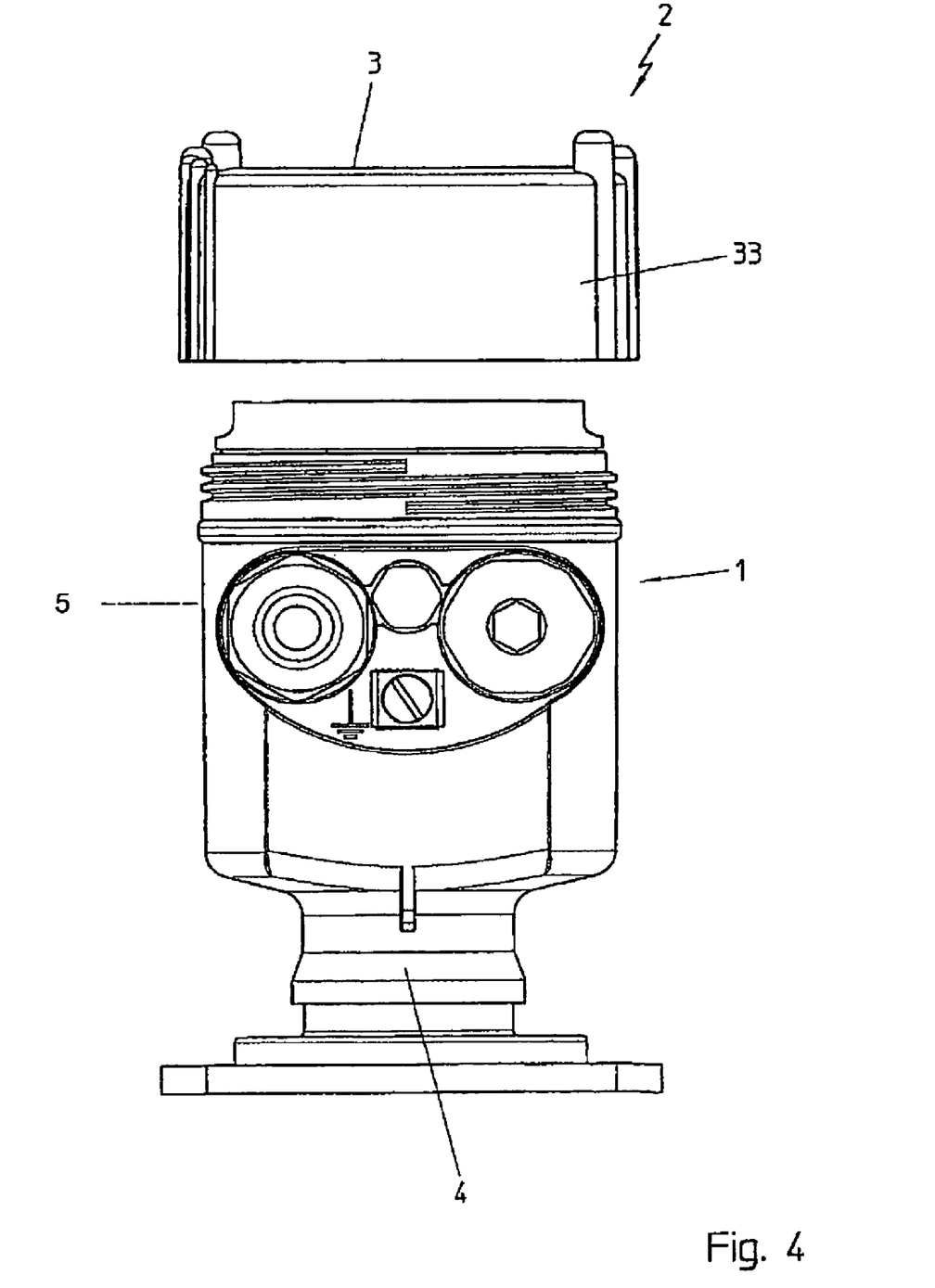
FIG. 4 is a schematic illustration of a modular system according to the invention in an assembled state.

The schematic illustration of FIG. 4 three modules already described above of the measuring system 2 in an assembled state. The low power sensor unit 4 is connected to the power supply device 1 which in turn is connected to the display and adjustment unit 3 by means of respective attachment means (not shown). Further, it can be seen from FIG. 4 that the cover 33 is screwed on the display and adjustment unit 3, securing the latter additionally to the power supply device 1.

Figure 5:
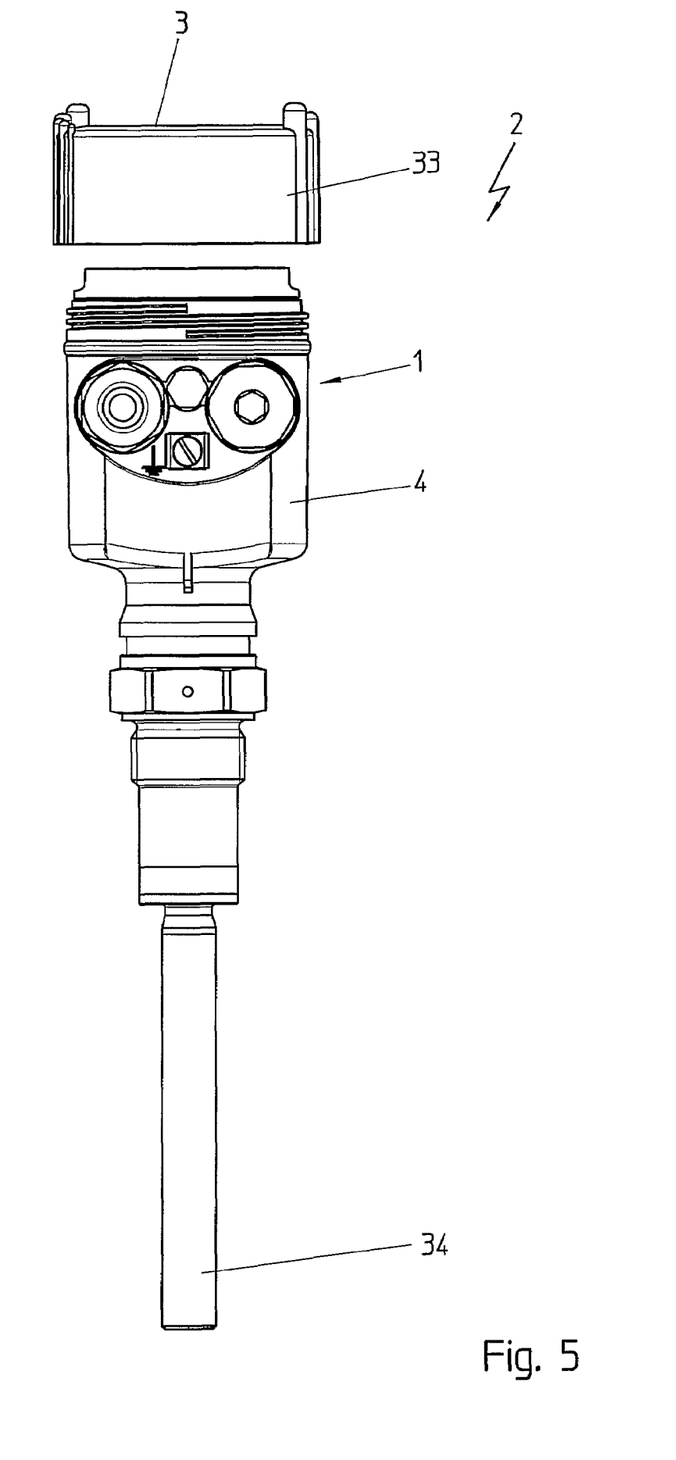
FIG. 5 is a schematic illustration of the modular system according to the present invention in a connected state.

FIG. 5 shows substantially the same arrangement as FIG. 4 of a measuring system 2 in an assembled state. However, here the entire low power sensor unit 4 is visible here, showing a level switch with integrated oscillator 34. Attached to the top of the low power sensor unit 4, again is the power supply device 1, to which in turn the display and adjustment unit 3 is connected with cover 33.

Figure 6:
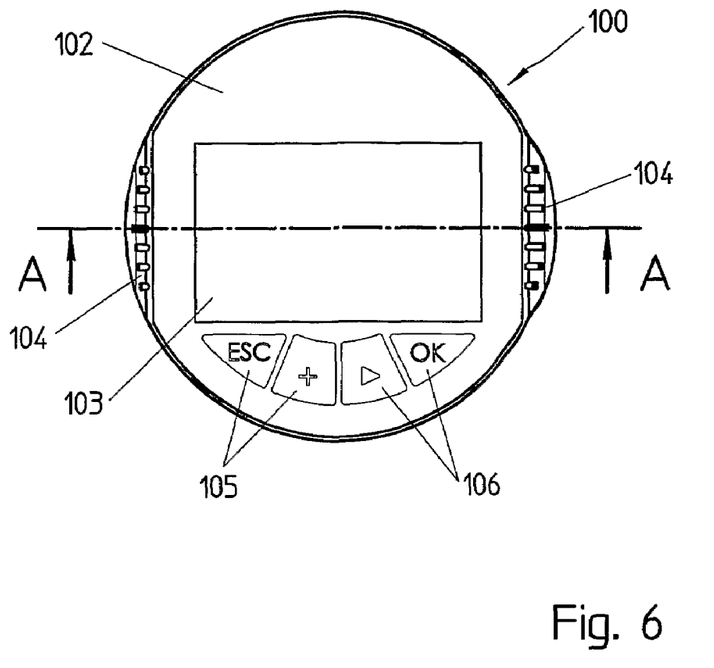
FIG. 6 a top view of an input and output device according to the present invention and an operating and display module.

From the top view of an input and output device 100 shown in FIG. 6, the upper side 102 of the input and output device 1 with the therein contained display means 103 and operating keys 105, 106 can be clearly seen. The input and output device 100 has an essentially cylindrical body that shows two handle recesses 104. The handle recesses 104 are situated opposite each other and serve for a better handling of the input and output device 100, in particular for turning same.

In the exemplary embodiment shown here, the display means 103 is an LCD display placed in the center of the upper side 102 of the input and output device 100. On one longitudinal side of the display device 103, there are operating keys 105, 106. These operating keys 105, 106 serve the purpose of operating or configuring under menu control the electronic equipment to be connected to the input and output device, which electronic equipment will be described in detail in the following. Of course, even less or more keys 105, 106 may be mounted to an input and output device 100 usable in connection with a module according to the invention. Furthermore, it would of course also be possible to provide, for example, on the other longitudinal side of the display means 103 further switches and keys or operating members, respectively.

Figure 7:
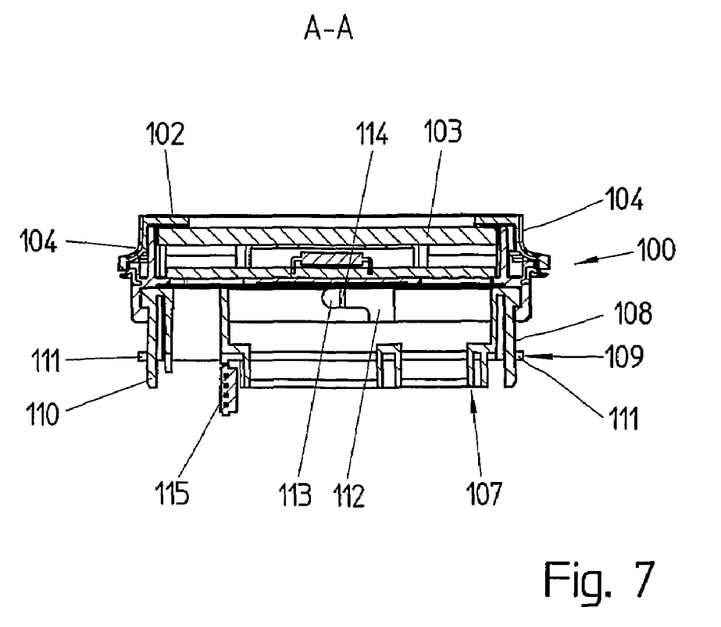
FIG. 7 a section of the input and output device taken along line A-A in FIG. 6.

FIG. 7 shows a section along line A-A of FIG. 6. As can be seen, the input and output device 100 here is already mounted to a reception part 108 that is normally firmly connected to an electronic equipment not shown here or to the power supply device 1 shown in FIG. 1. The reception part 108 here is attached to the power supply device by means of attachment means 109, in particular locking projections 111. Thus, the reception part 108 rests with its lower side 107 on the upper side of the electronic equipment. It features an electric plug connection 115 connected to the power supply device 1. This electric plug connection 115 is in connection with an electric contacting means of the power supply device.

In particular, a pivot receiving recess 112 can be recognized in FIG. 7, into which a pivot not shown here may be introduced. In its rear part, the pivot receiving recess has a blocking elevation 114 delimiting a part 113 of the pivot receiving recess. The specific configuration of this attachment means will be explained in more detail with reference to FIG. 8.

Figure 8:
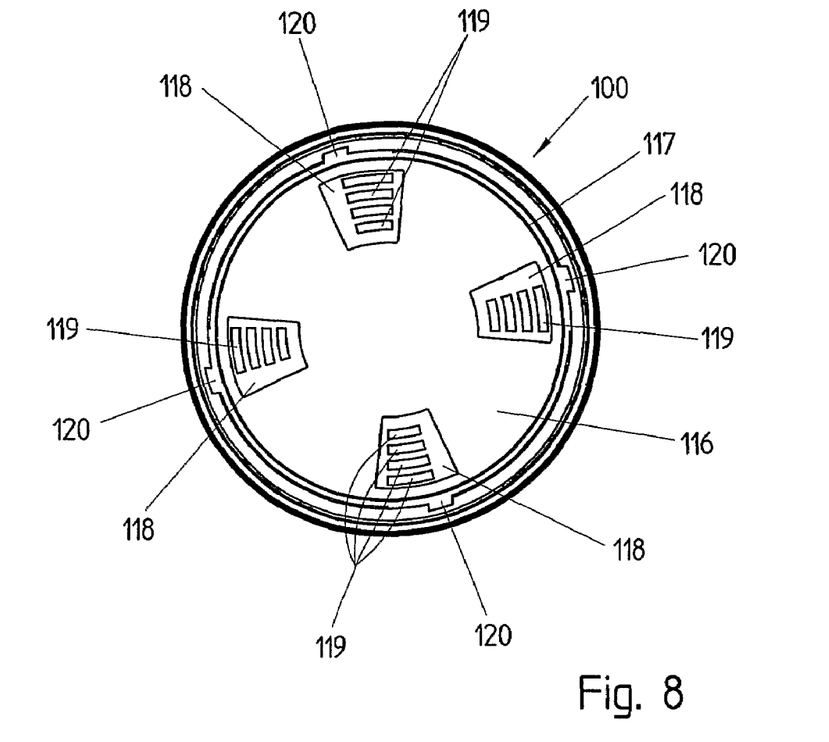
FIG. 8 a view from below of the input and output device shown in FIG. 6.

Further details of the input and output device 100 and, hence, implicitly of the power supply device 100, can be seen in the view from below according to FIG. 8. As can be very well recognized, the input and output device 100 has a cylindrical body and accordingly a ring member 110, in which the pivot receiving recesses 112 end on the front side visible here. These openings of the pivot receiving recesses 112 are indicated with reference numeral 120. In total, four pivot receiving recesses 112 are present in the exemplary embodiment of an input and output device 100 shown in FIG. 6, each offset by 90°, which end in corresponding recesses or openings 120 on the front side of ring member 110.

Figure 9:
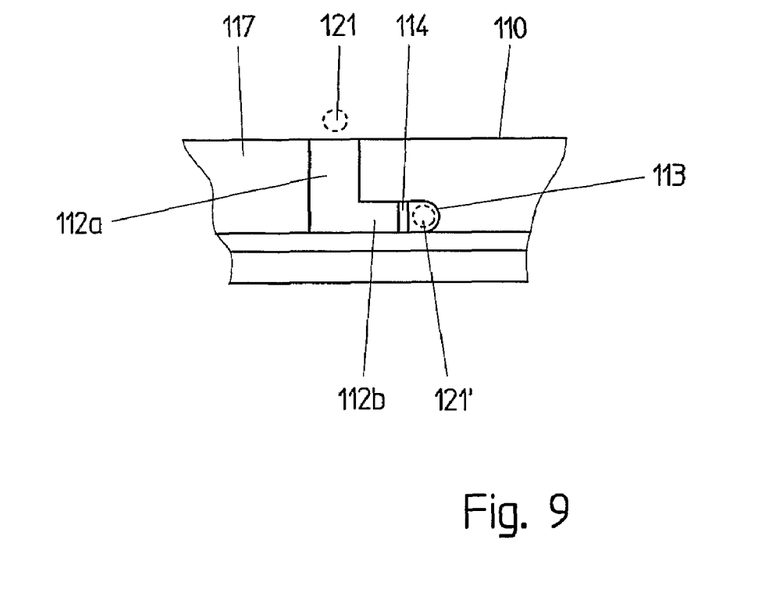
FIG. 9 a detail of the inner side of a ring member of the input and output device shown in FIGS. 6 through 8.

The ring member 110 hence features pivot receiving recesses 112 on the inner side 117 each shown in FIG. 9. The ring member 110 itself, as will be explained below, will be inserted in a corresponding tube or cylinder piece that is connected to the power supply device.

In the mounted state of the device, the lower side 116 of the input and output device is facing the power supply device. Here, four circle ring segment sections 118 are present, in each of which several contact surfaces 119 are grouped. Each group of contact surfaces 119 has the shape of a ring segment. These contact surfaces 119 are connected to the operating keys 105, 106 or the display means 103 via a line not shown here. They serve for establishing a contact with the second contacting means 123 present on the electronic device which are explained in more detail in FIG. 10. In the exemplary embodiment shown in FIG. 8, four groups of contacting means, hence the contact surfaces 119, are present so as to allow that the input and output device 100 can be mounted in four different positions on the power supply device and that in each selected position a contact may be established with the second contacting means 123 of the power supply device.

Figure 10:
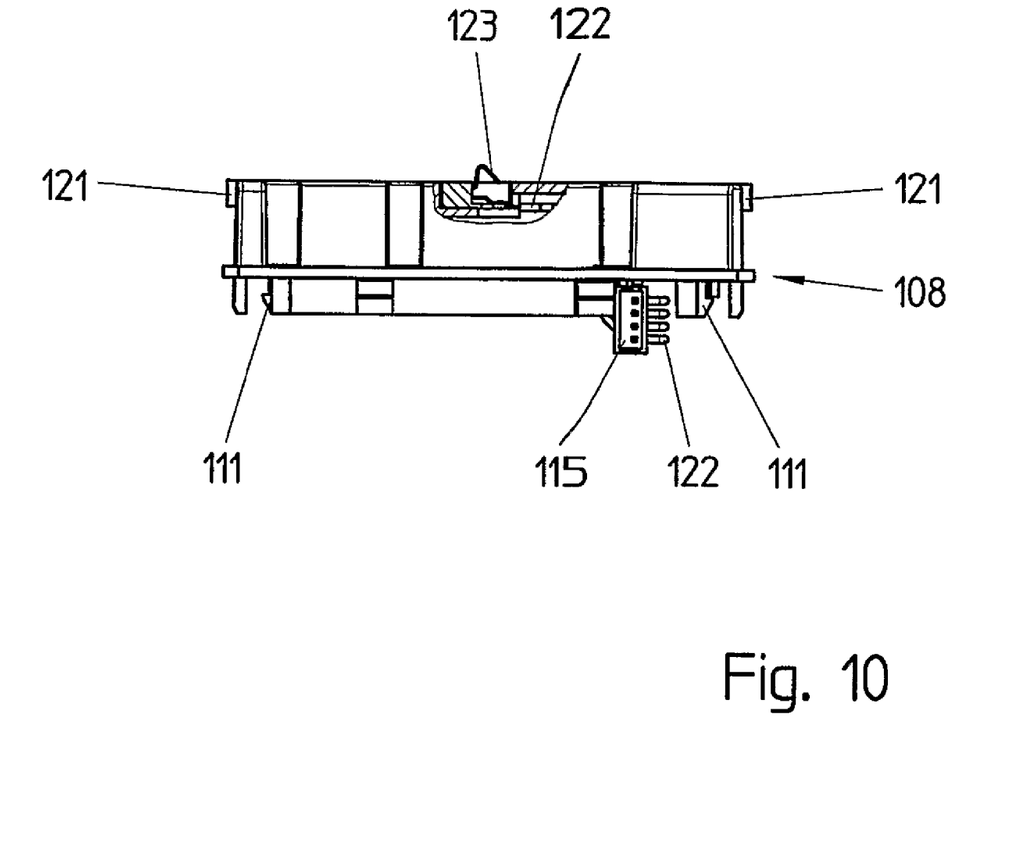
FIG. 10 a schematic sectional view of a reception part that may be attached to an electronic equipment by a snap-on catch and that serves for receiving an input and output device according to the preceding figures.

The reception part 108 of the power supply device is shown in FIG. 10 in a schematic partial section. As can be seen, the reception part 108 is provided with several pivots on the upper side, i.e. with at least three pivots, that have to be introduced into the pivot receiving recesses 112 or their associated openings 120. On the opposite side, several locking projections 111 are present that may be firmly hooked in a corresponding counterpart on the power supply device so that the reception part 108 and the power supply device are firmly connected to each other. The reception part 108 has the form of a tube, to the outside of which the pivots 121 are mounted so that the outside may be put onto the inside 117 of the input and output device 100 and may be secured by an axial and rotational movement, as it is usual for bayonet joints, in the desired position of the input and output device 100 on the reception part 108.

In a schematic view in FIG. 10, the second contacting means 123, as well, is shown in the form of one or more contact springs 123 connected to an electric line 122 by means of the electric plug connection 115 already explained above. The electric plug connection 115 may then in turn be connected to the power supply device or the electronic equipment.

The electric contact springs 123 in the representation shown in FIG. 10 are bent from the horizontal in order to ensure a contact with the respective contact surfaces 119 of the input and output device in the state placed on the power supply device 1 or the electronic equipment even with a different spacing of the contact surfaces from the contact spring. When the input and output device 100 according to FIGS. 5 through 9, and the reception part 108 of the power supply device or the electronic equipment are connected, then only one group of contact springs 123 need to be present that make contact with a group of contact surfaces 119. Of course, it is also possible that several groups of contact springs 123 are present on the reception part 108, and only one group of contact surfaces 119 is provided on the input and output device 100.

Other embodiments are in the scope of the following claims.

The invention claimed is:

1. A power supply device for energizing a modular measuring system, the modular measuring system being adapted for measuring or detecting a filling level or a pressure, the modular measuring system comprising a modular display and adjustment unit and a modular low power sensor unit, wherein the power supply device is adapted to be disposed and connected electrically between the display and adjustment unit and the low power sensor unit, enabling for the modular display and adjustment unit and the low power sensor unit to be energized simultaneously, and enabling data communication between the display and adjustment unit and the low power sensor unit;
wherein the power supply device is adapted to be fitted to the low power sensor unit allowing for a power requirement of <1.2 mA at 5V.

2. The power supply device according to claim 1, whereby the power supply device has a housing being adapted to be interposed between the display and adjustment unit and the low power sensor unit.

3. The power supply device according to claim 2, whereby an energy store is arranged within the housing.

4. The power supply device according to claim 3, whereby the energy store is a battery, an accumulator, or a gold CAP.

5. The power supply device according to claim 1, which is adapted to be fitted to the low power sensor unit comprising a probe for level measurement or detection and/or switching of liquids or solids having a two wire control loop, in particular a Namur interface, allowing for the power requirement of <1.2 mA at 5 V.

6. The power supply device according to claim 2, whereby the housing is provided with respective attachment means being adapted to cooperate with respective attachment means of the display and adjustment unit and the low power sensor unit to allow for a detachable engagement.

7. The power supply device according to claim 3, having first and second contacting means, whereby the first contacting means are provided for connection of the energy store to the display and adjustment unit and the low power sensor unit, and the second contacting means are provided for data lines which are connected through the power supply device.

8. The power supply device according to claim 7, whereby the energy store is connectable via the first contacting means to the input keys of the display and adjustment unit.

9. The power supply device according to claim 7, whereby the energy store is connectable via the first contacting means to a microcontroller of the low power sensor unit.

10. The power supply device according to claim 7, whereby the data lines of a display controller of the display and adjustment unit are connectable through the power supply device via the second contacting means to the microcontroller of the low power sensor unit.

11. The power supply device according to claim 1, which is adapted such that the display and adjustment unit is attachable to the power supply device in at least two positions.

12. A modular system comprising a modular display and adjustment unit, a modular power supply device, and a modular low power sensor unit which are detachably connectable to each other and which are adapted to be brought into an electrical contact with each other, whereby the power supply device energizes both the display and adjustment unit as well as the low power sensor unit simultaneously, when the modules are connected to each other.

13. The modular system according to claim 12, whereby the low power sensor unit comprises a probe for level measurement or detection and/or switching of liquids or solids, the probe comprising a two wire control loop, in particular a Namur interface, having a power requirement of <1.2 mA at 5 V.

14. The modular system according to claim 12, whereby the low power sensor unit can be adjusted by means of the display and adjustment unit with the power supply unit interposed in between.

15. The modular system according to claim 12, whereby a controller accommodated in the display and adjustment unit and a microcontroller accommodated in the low power sensor unit communicate with each other with the power supply unit, having contacting means connecting the respective data lines through the housing, connected in between.

16. The modular system according to claim 12, further comprising an A/D converter being either internal or external to the microcontroller of the low power sensor unit, which reads the voltage of the power supply device to close a circuit upon detecting a predetermined voltage value, to thereby connect the power supply unit to the microcontroller.

17. The modular system according to claim 12, whereby the display and adjustment unit and the power supply device are adapted to be attached to each other in at least two positions.

18. A sensor unit, comprising a low power sensor operating in the range below 1.2 mA at 5 V, being built as a module, and being adapted to be brought into detachable engagement with a modular display and adjustment unit, and being connectable electrically thereto, whereby the sensor unit comprises an energy store and a power supply to allow for energizing both the sensor unit as well as the display and adjustment unit, when attached and connected electrically to the low power sensor unit.

19. The sensor unit according to claim 18, whereby the energy store is an accumulator or a gold CAP, which is charged by a step up and a controllable power source, whereby the charging current can be varied depending on the resist current of the sensor.

20. The sensor unit according to claim 18, comprising further a microcontroller, querying cyclically whether the display and adjustment unit is attached or not, and connecting the display and adjustment unit to the internal power supply, in case the presence of the display and adjustment unit is detected.

21. The sensor unit according to claim 18, whereby the microcontroller monitors the operating voltage of the energy store, to deenergize the display and adjustment unit upon the detection of the operating voltage falling below a predetermined threshold value, and recharges the energy store, whereby the power supply of the measuring operation is not interrupted.

22. The sensor unit according to claim 18, whereby the microcontroller energizes the display and adjustment unit upon the detection of a minimal operating value of the energy store.

* * * * *